United States Patent Office 3,459,690
Patented Aug. 5, 1969

3,459,690
UNGELLED, ORGANIC SOLVENT-SOLUBLE INTERPOLYMERS CONTAINING UNSATURATED ALDEHYDES AND COATING COMPOSITIONS MADE THEREFROM
Robert A. Baugh, Gibsonia, John S. Ostrowski, Pittsburgh, and Robert R. Zwack, New Kensington, Pa., assignors to PPG Industries, Inc., Pittsburgh, Pa., a corporation of Pennsylvania
No Drawing. Filed Jan. 24, 1967, Ser. No. 611,259
Int. Cl. C08f 21/00; C08g 47/10
U.S. Cl. 260—22          29 Claims

ABSTRACT OF THE DISCLOSURE

Interpolymers useful in air-drying coating compositions are made by the free-radical initiated copolymerization of one or more ethylenically unsaturated monomers and an acetal-modified polymer comprising a polymer containing hydroxyl groups reacted with an ethylenically unsaturated aldehyde. Polyesters reacted with acrolein or methacrolein are preferred. The interpolymer or composition can be modified with an organosilicon compound, preferably an organopolysiloxane reactive with hydroxy groups. Coatings from the compositions described are fast drying and have exceptionally high gloss.

---

This invention relates to ungelled resinous interpolymers useful in air-drying coating compositions, and more particularly to such interpolymers made by copolymerizing one or more ethylenic monomers and a polymer containing acetal groups derived from an unsaturated aldehyde.

The interpolymers of the present invention comprise an acetal-modified polymer made by reacting an ethylenically unsaturated aldehyde such as acrolein with a polymer containing hydroxyl groups in the polymer molecule. These acetal-modified polymers contain ethylenically unsaturated linkages derived from the unsaturated aldehyde and these are further reacted with one or more polymerizable ethylenic monomers under polymerization conditions to produce an interpolymer in which the original polymer backbone is coupled to the new polymeric chain through acetal groups.

To exemplify the nature of the acetal-forming reaction of the invention, there is set forth below an illustrative equation of the reaction which is believed to take place in producing one of the preferred embodiments of the invention. As shown, a polyester containing an excess of hydroxyl groups derived from the inclusion in the polyester of a polyol such as pentaerythritol is reacted with acrolein:

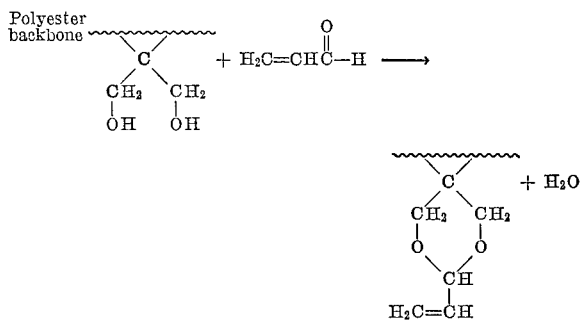

This polyester, containing acrolein acetal groups, is then interpolymerized with one or more vinyl monomers to produce a coupled copolymer which can be represented as follows:

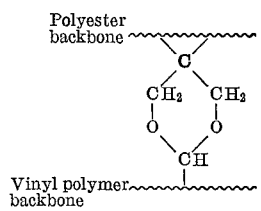

Of course, the foregoing illustrations are not intended to accurately depict the reaction or the exact structure of the product, which are obviously more complex than shown. For example, some cross-linking may be involved. Further, while the above illustrations are set forth as representative of the type reaction involved in this embodiment, other acetal structures can be obtained in other embodiments. For instance, a non-cyclic acetal can be formed when the hydroxyl groups are not adjacent. Also, the sequence of reaction need not be as shown; in some cases, the acetal can be formed concurrently with or prior to the formation of the polymer.

The interpolymers of the invention have a number of highly advantageous properties when used in coating compositions. They provide in many cases air-drying compositions which have exceptionally high gloss and which can be applied using conventional techniques, such as by spraying, using paint compositions containing a high proportion of non-volatile solids. These compositions have highly desirable characteristics including fast drying properties such that coatings become tack-free in short times and which permit the application of masking tape within a short time after painting.

The interpolymers of the invention are particularly useful as vehicles for so-called polychromatic paints in which metallic pigments, such as aluminum flake, are incorporated. Paint compositions of this type made with the interpolymers herein as the major film forming component have greatly improved drying properties and gloss over conventional compositions based on alkyl-acrylic vehicles or on alkyd copolymer vehicles.

The hydroxyl-containing polymer which is used as the base polymer for the formation of the acetal can be essentially any polymer containing free hydroxyl groups, i.e. hydroxyl groups which are available for further reaction. The number of hydroxyl groups which the polymer should have depends upon the amount of aldehyde which is to be reacted with it. In general, it is preferred that the polymer have a hydroxyl number of at least about 80 (hydroxyl number can be determined by acetylating the sample with acetic anhydride and then neutralizing with potassium hydroxide; the hydroxy number is the number of milligrams of potassium hydroxide per gram of sample).

The preferred hydroxyl-containing polymers for use in the invention are polyesters containing excess hydroxyl groups; this is especially true when air-drying, high-gloss enamels are desired to be made from the interpolymer. The polyester can be non-oil-modified or modified with oil or fatty acids and is prepared by reacting a polyol with a polycarboxylic acid using ratios and reaction conditions so as to produce a polyester of the desired hydroxy number. Preferred are polyesters made from polyols having 3 or more hydroxyl groups, since these provide polyesters having hydroxyl groups pendent on the polymer chain.

Pentaerythritol is a specific preferred polyol for use in making polyesters for use herein, but other polyols having, for example, 2 to 12 carbon atoms can also be used, including such polyols as glycerol, ethylene glycol, diethylene glycol, 1,2,6-hexanetriol, trimethylolpropane, dipentaerythritol, sorbitol, mannitol, and others. These are reacted with polycarboxylic acids (or their anhydrides) such as adipic acid, succinic acid, maleic acid, fumaric acid, phthalic acid, isophthalic acid, tetrachlorophthalic acid, trimellitic acid, and similar acids having preferably up to about 12 carbon atoms. If an oil-modified polyester is desired, the polyester may be modified with a drying or semi-drying oil, such as linseed oil, tung oil, soya oil, dehydrated castor oil or the like, or with corresponding fatty acids. The polyester or alkyd is made using conventional techniques, provided only that the reaction is carried out so as to provide a product having the desired level of hydroxyl functionality.

There may also be employed drying or semi-drying oils or their fatty acids which have been modified to contain available hydroxyl groups. For example, a triglyceride such as linseed oil or soybean oil can be transesterified with a polyol such as pentaerythritol to provide a product of high hydroxyl number. Similar products are obtained by partially esterifying a polyol (such as pentaerythritol) with fatty acids derived from these oils. Such transesterification and alcoholysis products can be employed in the invention and are considered to be within the term "polymers containing hydroxyl groups" since they are film-forming and easily polymerized by heating or oxidation.

In addition to the above, other polymers containing hydroxyl groups can also be employed. These may be, for example, polymers of unsaturated aliphatic alcohols with ethylenic monomers. Exemplifying this type of polymer are copolymers of allyl alcohol and styrene, several of which are available commercially. Other polymerizable ethylenic alcohols can also be employed in making such polymers, for example, methallyl alcohol and the like, with polymers made with aliphatic unsaturated alcohols containing up to about 10 carbon atoms being particularly useful. Various vinyl monomers can be copolymerized with the alcohol to provide the copolymer, these including various hydrocarbons in addition to styrene, e.g., vinyl toluene, as well as halogenated hydrocarbons, such as alpha-chlorostyrene, chlorobutadiene, and the like; unsaturated esters, such as vinyl acetate, vinyl butyrate, methyl methacrylate, ethyl acrylate, and the like; and unsaturated nitriles, such as acrylonitrile or methacrylonitrile.

Other hydroxyl-containing polymers useful in the invention include hydroxyl-modified vinyl halide polymers, these being preferably co-polymers of vinyl chloride or vinyl bromide with a vinyl ester such as vinyl acetate, vinyl butyrate or the like. Hydroxyl groups are introduced in these polymers by hydrolysis of part or all of the ester groups in the copolymer structure. Polyvinyl alcohol and similar polymers containing polymerized vinyl alcohol structures, such as partially hydrolyzed polymer of vinyl acetate and similar vinyl esters, can also be utilized.

Still other hydroxyl-containing polymers which can be used in certain instances include polyethers containing hydroxyl groups, prepared, for example, by the reaction of a polyol such as sucrose, sorbitol, glycerol or the like with an alkylene oxide such as ethylene oxide, propylene oxide, or butylene oxide, or a mixture of such oxides. Epoxide resins, such as reaction products of epichlorohydrin with dihydric phenols such as Bisphenol A, also generally contain hydroxyl groups.

The unsaturated aldehyde reacted with the foregoing polymers to produce the acetal structures can be essentially any aldehyde containing a polymerizable ethylenic group. Acrolein and methacrolein are particularly preferred unsaturated aldehydes, but crotonaldehyde and others may also be utilized. Mixtures of aldehydes can also be employed; such mixtures may include non-ethylenic aldehydes, such as benzaldehyde, if desired. In most cases, the acetal-modified polymer is produced using from about 3 percent to about 15 percent by weight of aldehyde, based on the total of the aldehyde and hydroxyl-containing polymer; the preferred products, such as those employed in automotive refinish enamels, contain from about 8 percent to about 12 percent of the aldehyde, on the same basis.

The acetal-containing product is ordinarily made by reacting the aldehyde with the preformed polyester or other hydroxyl-containing polymer. In producing the acetalized polymer in this manner, the polymer containing hydroxyl groups is usually reacted with the unsaturated aldehyde at elevated temperatures, e.g., from about 140° F. to about 320° F. It is desirable to include an acid catalyst, such as para-toluene sulfonic acid, phosphoric acid, or the like. In some instances, the polyester or other polymer is produced and acetalized in the same reaction mixture by including the unsaturated aldehyde with the polymerization mixture, but this procedure may produce a product of high viscosity and having a tendency to discolor. When the process is carried out in this manner it is best to avoid the use of a glycol and an added acid catalyst is not employed in some instances, e.g., when an acid such as phthalic acid or anhydride is present.

In forming the interpolymer from the unsaturated aldehyde-modified polymer containing hydroxyl groups, one or more ethylenically unsaturated monomers are reacted with the acetalized polymer under polymerization conditions. These ethylenic monomers, which preferably contain a vinyl group, can be any of the various copolymerizable monomers of this type, the choice of monomers being dependent primarily upon the particular properties desired. Generally preferred are vinyl aromatic hydrocarbons, such as styrene and vinyl toluene, and acrylic monomers, such as alkyl acrylates and methacrylates containing 1 to 20 carbon atoms in the alkyl group. Unsaturated nitriles, such as acrylonitrile and methacrylonitrile, are also often employed and provide desirable interpolymers. Specific preferred alkyl acrylates and methacrylates include methyl methacrylate, ethyl methacrylate, butyl methacrylate, ethyl acrylate, butyl acrylate, 2-ethylhexyl acrylate and lauryl methacrylate.

In addition to the above preferred monomers, however, various other polymerizable monomers can be utilized if desired, including unsaturated monocarboxylic and polycarboxylic acids, such as acrylic acid, methacrylic acid, crotonic acid, methyl hydrogen maleate, butyl hydrogen fumarate, and fumaric acid, as well as the anhydrides of those acids which form anhydrides; other olefinic hydrocarbons, such as alpha-methyl styrene, isobutylene, 1,3-butadiene, and the like; halogenated olefinic hydrocarbons, such as alpha-chlorostyrene, 2-chloropropene and 2,3-dichloro-1,2-butadiene; and other unsaturated esters, such as vinyl acetate, vinyl propionate, vinyl butyrate, methyl crotonate, dimethyl maleate, dibutyl fumarate, allyl chloride and others.

The proportion of monomers to acetal-modified polymer can be varied widely. For example, in some instances, as much as 90 percent or more of the interpolymer can be the additional monomers, while in other cases as little as 5 percent or less of the interpolymer may be comprised of such monomers. For use in automotive refinish enamels, it is preferred that the monomers make up from about 40 percent to about 80 percent of the total interpolymer and the acetal-modified polymer about 20 percent to about 60 percent.

The acetal-modified polymer is interpolymerized with the ethylenic monomers using conditions at which free radical-initiated addition polymerization reactions take place. Ordinarily, a free radical catalyst, such as benzoyl peroxide, cumene hydroperoxide, alpha, alpha'-azobis (isobutyronitrile), tertiary-butylperoxy isopropyl carbonate, or the like, is utilized along with sufficiently elevated temperatures to provide free radicals at an appreciable rate. Other methods include the use of ultraviolet or other radiation to generate free-radicals. The choice of catalyst and reaction conditions is usually made depending upon the particular monomers employed, in accordance with conventional practice for polymerization of such monomers.

The coating compositions herein can be modified by addition of an organosilicon compound. The preferred manner of including an organosilicon is by reaction of the interpolymer or interpolymer components with an organosilicon compound which is reactive with hydroxyl groups. Such organosilicon-modified interpolymers in many cases provide coatings of improved properties, such as increased durability and better chemical resistance.

Reaction with the organosilicon can be carried out at essentially any time during the preparation of the interpolymer. For example, the organosilicon compound can be added to the polyester or the polyester-forming components to produce a silicon-containing polyester, which is then further reacted with unsaturated aldehyde and vinyl monomers as described above. Alternatively, the reaction with aldehyde can be carried out prior to incorporation of the organosilicon compound, which can be added before or after the interpolymerization with the additional monomers or concurrently therewith. It is only necessary that some hydroxyl groups be available for reaction with the organosilicon.

In some cases, e.g., when the organosilicon is added along with or after the monomers, it is desirable to include a hydroxyl-containing ethylenic monomer among the monomers. Hydroxyalkyl esters of unsaturated acids are preferred for this purpose, examples being hydroxyethyl acrylate and methacrylate and 2-hydroxypropyl acrylate and methacrylate.

As an alternative to reaction with the organosilicon as described above, an organosilicon can be added to the interpolymer or coating composition without attempting to induce reaction. Non-reactive types of organosilicons, as well as those reactive with hydroxyl groups, can be employed in this mannner.

The amount of organopolysiloxane or other organosilicon included with the interpolymer or coating composition can be varied widely. For example, up to about 50 percent or more of the weight of organosilicon-modified interpolymer or coating composition can be the organosilicon; typically, when such a compound is used it forms from about 10 to about 30 percent of the total weight of interpolymer and organosilicon.

Generally employed as the organosilicon compound is an organopolysiloxane resin. Such organosiloxane resins are well known in the art, and those which are typically employed in this invention conform to the general unit formula:

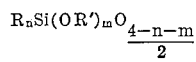

where R is a monovalent organic radical bonded to silicon by a carbon-to-silicon bond and R' is hydrogen, an alkyl radical, an aryl radical, or an acyl radical. The value of $n$ in the above formula is between about 0.5 and 1.9 and the value of $m$ between 0.01 and 2.5; the value of $m$ plus $n$ must be between 0.51 and 3.

The substituents represented by R in the above formula include, for example, monovalent hydrocarbon radicals such as methyl, ethyl, propyl, hexyl, octadecyl and similar alkyl radicals; monovalent cycloaliphatic radicals such as cyclohexyl and cyclopentyl; aryl radicals, for example, phenyl, methylphenyl, benzyl, and the like; alkenyl, for instance, vinyl, allyl, 3-butenyl, and linoleyl; cycloalkenyl radicals such as cyclopentadienyl; and alkenylaryl groups such as the vinyl phenyl radical. R may also be a substituted hydrocarbon radical, for example, a halo-substituted organic radical such as pentachlorophenyl, 1-bromo-3-trifluoropropyl, and delta-trifluoro-gamma-difluorobutyl, or it may be an amino-substituted hydrocarbon group such as aminomethyl, 3-aminopropyl, and the like. Other substituted hydrocarbon radicals which may be included within the scope of the R substituent are cyano-substituted hydrocarbon radicals such as 3-cyanopropyl, carboxyl-subsituted radicals such as 3-acrboxylpropyl, and sulfur-substituted radicals, including 3-mercaptopropyl, ethyl thioethyl, and ethyl sulfonylpropyl, as well as hydroxy-substituted radicals, such as hydroxypropyl.

The groups represented by R' include hydrogen and alkyl groups of 1 to 20 carbon atoms, such as methyl, ethyl, propyl, butyl, amyl, hexyl, heptyl and octyl. R' may also be an aryl radical such as phenyl, tolyl or halogen or other substituted phenyl, or an acyl radical such as acetyl, propionyl, butyryl or other similar acyl radicals, generaly having between 1 and 8 carbon atoms.

Examples of organosiloxane resins and methods of producing them can be found in various publications as well as in patents such as U.S. Patents 2,258,218, 2,258,219, 2,258,222, 2,371,050, 2,389,477, 2,584,341, 2,663,694, 2,746,942, 2,768,149, and 3,015,637.

The preferred organosiloxane resins are those now commercially available, which usually contain phenyl and/or methyl substitution.

As indicated above, the interpolymers obtained in accordance with the invention are especially useful in air-drying coating compositions. When employed for this purpose, they can be utilized as clear finishes, in which case the interpolymer is simply applied from a solution of suitable viscosity and allowed to dry at ambient temperatures to provide a clear, hard, glossy film. Preferably, however, they are utilized as the sole or major film-forming component of pigmented coating compositions. Such compositions are especially useful as air-drying automotive refinish paints and for similar applications. Compositions containing these interpolymers can be pigmented with any of the various conventional pigments employed in such automotive and industrial paint compositions, including metallic pigments such as aluminum flake which provide metallic or polychromatic finishes.

Suitable solvents, fillers, driers, additives and the like are also incorporated in the coating composition if desired, and the compositions are applied to various substrates such as wood and metal by conventional techniques. The compositions are particularly adapted to application by spraying because compositions of relatively high solids content have suitable viscosity.

Set forth below are several examples of the method and practice of the invention. These are set forth as illustrative of the invention and are not to be construed as limitations thereon. All parts and percentages in the examples, as well as throughout the specification, are based on nonvolatile solids content and are by weight unless otherwise indicated.

EXAMPLE 1

An oil-modified polyester was produced from the following:

| | Parts by weight |
|---|---|
| Linseed fatty acids | 110 |
| Semi-oxidizing fatty acids (Iodine value 135–145) | 212 |
| Pentaerythritol | 186 |
| Phthalic anhydride | 129 |
| Xylene | 24 |

This mixture was charged into a kettle equipped with agitator, inert gas feed, trap and condenser and cooked at 380° F. to 420° F. until the product had an acid value of about 10 and a Gardner-Holdt viscosity of V–X at 70 percent total solids in xylene. There were then added 230 parts of xylene. The polyester had the following properties:

| | |
|---|---|
| Total non-volatile solids percent | 71.7 |
| Viscosity (Gardner-Holdt) | V–X |
| Acid number | 3.08 |
| Hydroxyl number | 160.6 |

This polyester was modified with acrolein by heating mixture of 957 parts of the polyester, 73 parts of acrolein, 0.5 part of p-toluene sulfonic acid and 933 parts of xylene to reflux. Heating was continued for 3 hours during which time 22 parts of water were removed and the temperature reached 264° F. This product was cooled to 164° F. and the following were added:

| | Parts by weight |
|---|---|
| Styrene | 420 |
| Methyl methacrylate | 210 |
| Acrylonitrile | 78 |
| 2-Ethylhexyl acrylate | 72 |
| Benzoyl peroxide | 9.75 |

This mixture was heated to 215–220° F. for 30 minutes and then 1.95 parts of benzoyl peroxide in 40 parts of xylene were added. Heating was continued for 7 hours with similar catalyst solutions being added after each of the first 6 hours (total catalyst 23.40 parts). The product was then sparged with inert gas to remove unreacted monomers, and cooled, and sufficient xylene added to make the total non-volatile solids content 48.5 percent. The product had a Gardner-Holdt viscosity of G–H and an acid number of 2.38.

The excellent properties of this product were shown by formulating an air-drying blue polychromatic enamel using the above product as the vehicle with aluminum flake and phthalocyanine blue pigments. The enamel contained 50 percent total solids of which 2.5 percent was pigment and 97.5 percent was resin. It had a viscosity of 60 seconds, No. 4 Ford cup. This enamel was sprayed as a 2 mil film (dry film thickness) over a conventional primer-surfacer used in refinishing automotiles (nitrocellulose-alkyd vehicle), and allowed to air-dry. The coating was tack-free in 2½ hours and had excellent overall properties, including high gloss (20° Gardner glossmeter reading of 84).

EXAMPLE 2

Following the procedure of Example 1 a similar interpolymer was produced except that methacrolein was used in place of acrolein. When formulated and evaluated as in Example 1, a coating of excellent properties including high gloss was again obtained.

EXAMPLE 3

This example illustrates the use of a mixture of acrolein and benzaldehyde, and the formation of both the polyester and the acetal in the same reaction mixture.

The following were charged into a reaction vessel:

| | Parts by weight |
|---|---|
| Safflower fatty acids | 1606 |
| Phthalic anhydride | 456 |
| Pentaerythritol | 780 |
| Benzaldehyde | 265 |
| Acrolein | 146 |
| Dibutyl tin oxide | 6 |
| Xylene | 340 |

This mixture was refluxed for 11 hours with removal of evolved water, a total of 240 parts of water being removed. Near the end of the reflux period 160 parts of solvent were taken off, and after refluxing was discontinued 1100 parts of xylene were added. The product had the following properties:

| | |
|---|---|
| Total non-volatile solids percent | 70.2 |
| Acid number | 5.32 |
| Hydroxyl number | 33.9 |
| Viscosity (Gardner-Holdt) | B–C |

This product was then used in making an interpolymer with the following:

| | Parts by weight |
|---|---|
| Product above (70 percent solids) | 1028 |
| Styrene | 180 |
| Methyl methacrylate | 706 |
| Methacrylonitrile | 108 |
| 2-ethylhexyl acrylate | 86 |
| Xylene | 612 |
| Benzoyl peroxide | 13.5 |

This mixture was refluxed for 7½ hours with seven hourly additions of 2.7 parts of benzoyl peroxide in 40 parts of xylene. The mixture was then sparged with inert gas, 266 parts of xylene were added and filtered. The product had the following properties:

| | |
|---|---|
| Total non-volatile solids | 54.3 |
| Viscosity (Gardner-Holdt) | V |
| Acid number | 2.62 |

This interpolymer was formulaetd as the vehicle in a blue polychromatic enamel (as in Example 1), the enamel having a solids contents of 46 percent and a viscosity of 52 seconds (No. 4 Ford cup). Coatings made therefrom were tack-free in 49 minutes at room temperature and had good properties, although having somewhat lower gloss than the coating of Example 1.

EXAMPLE 4

This example illustrates the use in the invention of a hydroxyl-containing material other than a polyester.

A mixture of 2469 parts of safflower fatty acids, 690 parts of pentaerythritol, and 90 parts of xylene was refluxed for 3 hours while removing evolved water. The product had an acid number of 7.1. There were added to 696 parts of this product (96.8 percent solids) 68 parts of acrolein, 898 parts of xylene and 0.38 part of p-toluene sulfonic acid. This mixture was heated to 214° F. and then slowly heated to 284° F. over a 1 hour period while removing 21 parts of evolved water. The product was then cooled to 134° F., and 616 parts thereof were mixed with the following:

| | Parts by weight |
|---|---|
| Methyl methacrylate | 1080 |
| Butyl methacrylate | 270 |
| Styrene | 180 |
| Xylene | 574 |
| Benzoyl peroxide | 19.15 |

This mixture was refluxed for ½ hour, then 600 parts of xylene were added and refluxing was continued. After 15 minutes 3.83 parts of benzoyl peroxide in 40 parts of xylene were added. Six similar additions were made hourly while continuing reflux for a total of 7½ hours. The product, after sparging with nitrogen and filtering, had the following properties:

| | |
|---|---|
| Total non-volatile solids percent | 50.1 |
| Viscosity (Gardner-Holdt) | U–V |
| Acid number | 2.2 |

Films of the above product air-dried to clear, hard, glossy coatings having desirable properties.

It may be noted that the above interpolymer contains a high proportion of additional vinyl monomers (85 percent of the total interpolymer). Such high proportions are especially desirable using this type of hydroxyl-containing polymer since it has been found that such interpolymers with lower proportions of additional monomers have a tendency to be hazy.

EXAMPLE 5

This example illustrates the preparation of an organosilicon-modified interpolymer.

A polyester was produced by refluxing the following for about 3 hours while removing evolved water:

| | Parts by weight |
|---|---|
| Safflower fatty acids | 1480 |
| Pentaerythritol | 857 |
| Phthalic anhydride | 594 |
| Dibutyl tin oxide | 6 |
| Xylene | 90 |

At the end of the reflux period 160 parts of water had been taken off; 1106 parts of xylene were added, whereupon the product had a solids content of 71 percent and an acid number of 3.41. A mixture of 610 parts of this product, 49 parts of acrolein, 737 parts of xylene and 0.31 parts of p-toluene sulfonic acid was refluxed for 4 hours and then the following were added:

| | Parts by weight |
|---|---|
| Styrene | 229 |
| Methyl methacrylate | 767 |
| 2-ethylhexyl acrylate | 74 |
| 2-hydroxyethyl methacrylate | 20 |
| Organopolysiloxane | 283 |
| Benzoyl peroxide | 13.6 |

The organopolysiloxane was an intermediate type phenyl-substituted siloxane resin having an average molecular weight of about 1600 and an average of about 4 hydroxyl groups per molecule; its unit formula is $$R_{1.00}Si(OH)_{0.4}O_{1.3}$$

This mixture was refluxed for 8 hours with 7 hourly additions of 2.7 parts of benzoyl peroxide in 40 parts of xylene. After sparging with nitrogen and the addition of 310 parts of xylene, the product had the following properties:

| | |
|---|---|
| Total non-volatile solids _____percent | 54.3 |
| Viscosity (Gardner-Holdt) | W–X |
| Acid number | 2.72 |

Films of this product air-dried to provide high-gloss coatings having comparable properties to those described above.

Other organosilicon compounds can be substituted for that in the above example. For example, there can be used the resin known as Dow-Corning DC–840, which is an organopolysiloxane comprising mono- and di-substituted methyl siloxane units and phenyl siloxane units, or the methyl and phenyl-substituted siloxane known commercially as SR–82, or dimethyltriphenyltrimethoxytrisiloxane, or other such compounds. Also, other procedures can be used to introduce the organosilicon compound, as described above.

Good results for many purposes are also obtained by using other polymers having hydroxyl groups, such as the various polymers described hereinabove, in place of those of the foregoing examples. Similarly other unsaturated aldehydes, other ethylenic monomers and other pigments can be substituted for those exemplified, and other polymerization methods as known in the art can be utilized instead of those shown. Also, while the interpolymers of the invention are especially advantageous when used in air-drying finishes, coatings made therefrom can be force-dried or baked if desired.

According to the provisions of the patent statutes, there are described above the invention and what are now considered to be its best embodiments. However, it is to be understood that the invention can be practiced otherwise than as specifically described.

What is claimed is:

1. An ungelled, organic solvent-soluble interpolymer formed by the free radical initiated copolymerization of
   (a) an acetal-modified polymer comprising a polymer containing hydroxyl groups reacted with an ethylenically unsaturated aldehyde, and
   (b) one or more ethylenically unsaturated monomers;
said interpolymer containing said polymer containing hydroxyl groups coupled to a polymeric chain derived from said ethylenically unsaturated monomers through acetal groups from said unsaturated aldehyde.

2. The interpolymer of claim 1 in which said unsaturated aldehyde is acrolein or methacrolein.

3. The interpolymer of claim 1 in which said polymer containing hydroxyl groups is a polyester.

4. The interpolymer of claim 1 in which the polymer containing hydroxyl groups is a polyester made from a polyol having at least 3 hydroxyl groups.

5. The interpolymer of claim 4 in which the polyol having at least 3 hydroxyl groups is pentaerythritol.

6. The interpolymer of claim 1 in which the polymer containing hydroxyl groups is an oil or fatty acid modified polyester.

7. A coating composition comprising organic solvent, pigment and the interpolymer of claim 1.

8. The coating composition of claim 7 in which said pigment comprises aluminum flake.

9. The coating composition of claim 7 in which an organosilicon compound is an additional component.

10. The interpolymer of claim 1 in which the interpolymer contains as an additional component an organosilicon compound reactive with hydroxyl groups.

11. The interpolymer of claim 10 in which said organosilicon compound is an organopolysiloxane resin of the unit formula $$R_nSi(OR')_mO_{\frac{4-n-m}{2}}$$

where R is a monovalent organic radical bonded to silicon by a carbon-to-silicon bond; R' is hydrogen, alkyl of 1 to 20 carbons, aryl or acyl of 1 to 8 carbons; the value of $n$ is between 0.5 and 1.9; the value of $m$ is between 0.01 and 2.5; and the value of $n$ plus $m$ is between 0.51 and 3.

12. The interpolymer of claim 11 in which said organopolysiloxane contains phenyl groups or methyl groups or both.

13. A coating composition comprising organic solvent, pigment and the interpolymer of claim 10.

14. An air-drying resinous coating composition in which the major film-forming component consists essentially of an ungelled, organic solvent-soluble interpolymer formed by the free radical initiated copolymerization of
   (a) an acetal-modified polymer comprising a polyester having a hydroxyl number of at least about 80 reacted with acrolein or methacrolein, and
   (b) one or more polymerizable ethylenically unsaturated monomers;
said interpolymer containing said polyester coupled to a polymeric chain derived from said ethylenically unsaturated monomers through acetal groups from said acrolein or methacrolein.

15. The coating composition of claim 14 in which said monomers are selected from the group consisting of styrene, ethylenically unsaturated nitriles, and alkyl acrylates and methacrylates having up to about 20 carbon atoms in the alkyl group.

16. A method of producing an interpolymer which comprises the steps of
   (a) reacting an unsaturated aldehyde with a preformed polymer containing hydroxyl groups to form an acetal-modified polymer, and
   (b) interpolymerizing said acetal-modified polymer with one or more ethylenically unsaturated monomers under conditions at which free radical-initiated polymerization reactions take place; whereby there is produced an interpolymer containing said polymer containing hydroxyl groups coupled to a polymeric chain derived from said ethylenically unsaturated monomers through acetal groups from said unsaturated aldehyde.

17. The method of claim 16 in which said polymer containing hydroxyl groups is a polyester.

18. The method of claim 16 in which said unsaturated aldehyde is acrolein or methacrolein.

19. The method of claim 16 in which said polymer is further reacted with an organosilicon compound reactive with hydroxyl groups.

20. The method of claim 19 in which the interpolymerized monomers include a hydroxyl-containing ethylenic monomer.

References Cited

UNITED STATES PATENTS

| | | | |
|---|---|---|---|
| 2,657,192 | 10/1953 | Miller et al. | 260—873 |
| 3,015,637 | 1/1962 | Rauner et al. | 260—22 |
| 3,123,578 | 3/1964 | Kraft | 260—22 |
| 3,244,651 | 4/1966 | Pannell | 260—23 |
| 3,207,645 | 9/1965 | Collardeau et al. | 260—67 |

FOREIGN PATENTS

| | | |
|---|---|---|
| 1,128,136 | 4/1962 | Germany. |
| 1,301,704 | 8/1962 | France. |

DONALD E. CZAJA, Primary Examiner

R. W. GRIFFIN, Assistant Examiner

U.S. Cl. X.R.

117—160, 161, 167; 260—33, 40, 41, 67, 827, 837, 878, 879, 884, 885